Aug. 12, 1947.                    L. F. KRAMER                    2,425,331
            GUARD DEVICE FOR CIRCULAR-SAW TABLE SAWING MACHINE
                            Filed Dec. 13, 1945
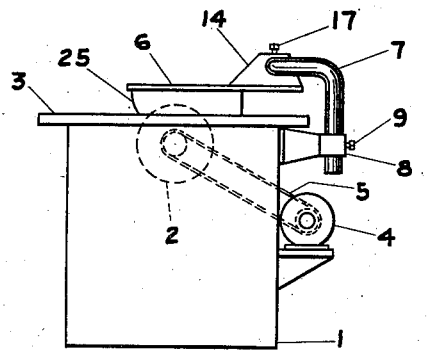
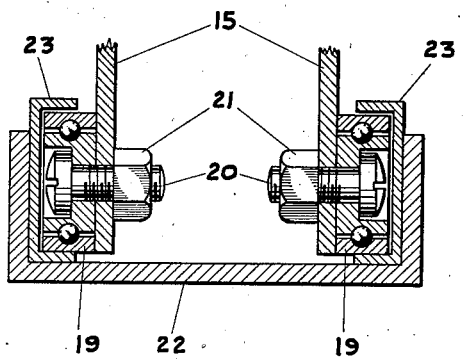
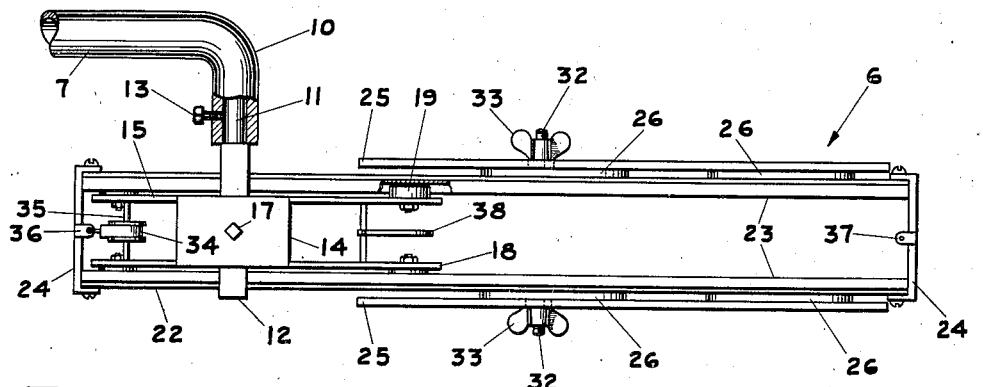
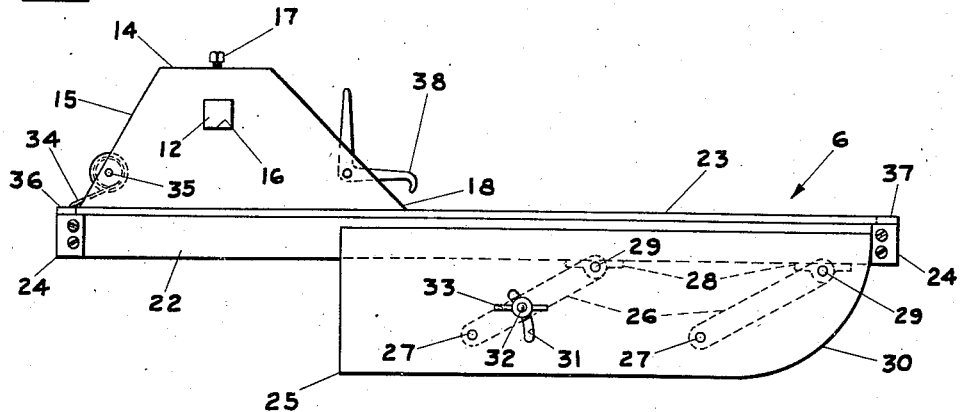
INVENTOR
LINZIE F. KRAMER
BY
ATTORNEY Patented Aug. 12, 1947

2,425,331

UNITED STATES PATENT OFFICE 2,425,331

GUARD DEVICE FOR CIRCULAR-SAW TABLE SAWING MACHINES

Linzie F. Kramer, Vallejo, Calif.

Application December 13, 1945, Serial No. 634,874

4 Claims. (Cl. 143—159)

(Granted under the act of March 3, 1883, as amended April 30, 1928; 370 O. G. 757)

This invention relates to guard devices and more particularly to adjustable saw guards.

An object of the invention is to provide an improved saw guard of such construction as to prevent accidental contact with the saw and possible injury to the operator of the same without interfering with the normal use of said saw.

Other objects of the invention are to provide an improved saw guard which is mounted so as to be subject to universal adjustment whereby the same may be used at various elevations and angular relations and which may be readily moved into a non-functioning position; to provide an improved saw guard having a universally mounted support and guide means movable longitudinally of the support together with pivoted guard means depending from the guide means whereby universal adjustment of the saw guard is permitted and whereby various thicknesses of material are accommodated by the guard means; to provide an improved saw guard having resiliently-mounted guard means disposed adjacent a saw so as to be maintained in engagement with the saw table or the material being sawed and being capable of swinging upwardly so as to ride over unusually thick material; and to provide improved elements and arrangements thereof in a saw guard of the character described and for the purposes set forth.

In accomplishing these and other objects of the present invention, I have provided improved details of structure, the preferred form of which is illustrated in the accompanying drawings, wherein:

Fig. 1 is a side elevational view of a saw guard, embodying the features of the present invention, mounted on a saw bench in overlying relation to a rotary saw.

Fig. 2 is a top plan view of the saw guard.

Fig. 3 is a side elevational view of the guard.

Fig. 4 is a transverse, vertical sectional view, showing the connection between the bracket and guide support of the guard.

Referring more in detail to the drawings:

In Fig. 1, the numeral 1 designates a saw bench or table having a vertically-mounted, rotary or circular saw blade or disc 2 (shown in dotted lines) supported beneath its upper surface or top 3 and projecting upwardly through a slot formed in the central portion of the top. A suitable motor 4 is disposed rearwardly of the saw blade and is drivingly connected thereto by an endless belt 5.

For shielding the saw blade and preventing accidental contact therewith, a guard 6 is mounted on the table 1 in overlying relationship to said blade and includes an angular upright pipe or tubular arm 7 having its lower portion supported by a horizontal bracket box 8. The latter is secured to the rear side wall or surface of the table and a suitable set screw 9 adjustably confines the arm 7 therein so as to permit relative vertical and rotatable movement of said arm upon loosening of the screw. As is most clearly shown in Figs. 1 and 2, the upper portion of the arm is bent forwardly and then laterally upon itself to provide a horizontal end portion 10 which extends parallel to the table top. A cylindrical bar or rod 11, having an angular or squared outer end portion 12, is slidably and rotatably mounted in the arm portion 10 and is held in adjusted positions by one or more set screws 13.

A U-shaped bracket 14 is adapted to be supported by the arm 11 and has a pair of depending, parallel legs or flanges 15 (Fig. 3). For slidably receiving the squared arm portion 12, square openings 16 are formed centrally in the flanges 15 and the bracket 14 is held in adjusted positions by a suitable set screw 17 which is screw-threaded through the upper surface of said bracket into engagement with said arm portion.

The bracket flanges 15 are of substantially triangular shape so as to have elongated lower end portions 18 which project forwardly and rearwardly of the bracket. A suitable bearing roller 19, preferably of the ball bearing type, is fastened externally to each lower flange corner by a suitable bolt 20 and nut 21 so as to be disposed with its axis perpendicular to the flange (Fig. 4). An elongated guide member or support 22, of inverted channel shape, underlies the bracket and is provided with longitudinal guide ways or channels 23 for receiving the rollers 19 whereby the support is slidable longitudinally of said bracket. Displacement of the rollers from the channels 23 is prevented by end brackets or stop plates 24 which are secured transversely across the ends of said channels and the support 22.

For pivotally suspending an elongated guard member or plate 25 from each longitudinal margin of the support 22, a pair of flat arms or links 26 (as shown in dotted lines in Fig. 3) depend from each margin in spaced, parallel relation and have their lower ends pivotally attached to the plate by suitable pins or bolts 27. The links 26 are pivotally connected to the support by a pair of spaced, transverse brackets or plates, as shown by the dotted lines 28 in Fig. 3, which plates are fastened to the underside of said support and have rotatable pins or pintles 29 for receiving the upper ends of said links. It is preferable that the guard plates 25 be formed of suitable plastic material so as to be transparent and thereby permit observation of the saw blade 2. As shown by the numeral 30, the forward or outer lower end portion of each guard plate is curved or bevelled to facilitate upward pivoting thereof upon the feeding of material to the saw blade.

Due to the fact that a pair of links connect each guard plate 25 to the support 22, the upper and lower edges of the plate remain horizontal when pivoted relative to said support. For limiting such movement of the guard plates, an arcuate opening or slot 31 is cut in each plate adjacent one of the bolts 27 and is swung on an arc about said bolt. A suitable pin or screw 32 projects laterally outwardly from one link of each pair of links for engaging within the slot 31 and receives a wing nut 33 for clamping the guard plates in adjusted positions. The slot coacts with the screw 32 to limit the swinging movement of the guard plates.

For resiliently maintaining the support 22 forwardly of the bracket 14 in overlying relation to the saw blade 2, a flat, coiled spring 34 is rotatably supported by a suitable rod or shaft 35 which extends transversely between the rear end portions of the bracket flanges 15. The free end of the spring 34 is fastened to the rear stop plate 24 of the support by means of an ear or lug 36 projecting forwardly from said plate. A similar ear or lug 37 is made integral with the forward stop plate for receiving a hook or latch 38 pivoted between the forward portion of the bracket flanges, whereby the support may be locked in a retracted position against the tension of the spring.

Operation

The operation of a guard device constructed as described is as follows:

The device is supported in the position shown in Fig. 1 with the tension of the spring 34 maintaining the support 22 forwardly of the bracket 14 and in overlying relation to the saw blade 2, whereby the guard plates 25 are disposed parallel to and straddle said blade. Upon the feeding of material to the saw blade, the curved forward ends 30 of the plates are engaged by the material and swung clockwise or upwardly and rearwardly so as to ride over said material. The pivoted links 26 permit this swinging movement of the plates and the weight of said plates constantly urge the same downwardly or counterclockwise into engagement with the material or the table top 3.

If desired, the guard plates may be swung in a clockwise direction to their retracted upper positions and maintained in such positions by tightening of the wing nuts 33 upon the screws 32. In order to render the guard device inoperative, the support 22 is slid rearwardly of the bracket 14 against the tension of the spring 34 and the pivoted latch 38 is engaged with the lug 37 of the forward stop plate 24. Upon release of the latch, the spring tension projects the support forwardly of the bracket. In addition, the connections between the arm 7 and bracket box 8, the rod 11 with the arm portion 10 and the bracket with said rod permit universal adjustment of the device and facilitate removal thereof.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A guard for a rotary saw having a table for supporting material in position to be sawed including, a bracket box projecting horizontally from the saw table, an angular upright arm mounted in the bracket and being adjustable vertically and rotatably thereof, an inverted U-shaped supporting bracket slidably mounted on the arm and disposed transversely thereof, the bracket having its depending flanges parallel to the saw, bearing rollers carried by the bracket flanges, a channel member underlying and extending horizontally longitudinally of said bracket, longitudinal guide ways carried by the channel member for receiving the bearing rollers so as to slidably support said channel member, stop plates extending transversely across each end of the channel member for preventing displacement of said rollers from the guide ways, guard plates disposed longitudinally of said channel member, a pair of links for pivotally connecting each plate to the channel member so as to provide for pivotal movement of the guard plates in a plane parallel to the flanges of said channel member and vertically of the saw table, each guard plate having an arcuate slot swung upon an arc about its connection with one of the links, a pin projecting from the latter link and engaging within the slot for limiting pivotal movement of the guard plate, a tension spring connecting the channel member to the bracket so as to urge said member forwardly of the bracket, and latch means carried by said bracket for releasably locking the channel rearwardly of the bracket.

2. A guard for a rotary saw having a table for supporting material in position to be sawed including, an inverted U-shaped supporting bracket mounted for universal adjustment rearwardly of the saw and above the table, the bracket having depending flanges disposed parallel to and on either side of said saw, bearing rollers carried by the bracket flanges, a guide support extending horizontally longitudinally of said bracket, guide means carried by the support for receiving the bearing rollers whereby said support may undergo longitudinal reciprocation relative to the bracket and saw, guard plates disposed longitudinally of the support, links for pivotally connecting the plates to said support so as to provide for pivotal movement of said plates in vertical planes parallel to the saw, means limiting pivotal movement of the plates, and resilient means for urging the support forwardly of said bracket in overlying relation to said saw.

3. A guard for a rotary saw having a table for supporting material in position to be sawed including, an inverted U-shaped supporting bracket mounted for universal adjustment rearwardly of the saw and above the table, the bracket having depending flanges disposed parallel to and on either side of said saw, bearing rollers carried by the bracket flanges, a guide support extending horizontally longitudinally of said bracket, guide means carried by the support for receiving the bearing rollers whereby said support may undergo longitudinal reciprocation relative to the bracket and saw, guard plates disposed longitudinally of the support, means for pivotally connecting the plates to said support so as to provide for pivotal movement of said plates in vertical planes parallel to the saw, and resilient means for maintaining the support forwardly of said bracket and in overlying relation to said saw.

4. A guard for a rotary saw having a table for supporting material in position to be sawed including, an inverted U-shaped supporting bracket mounted for universal adjustment rearwardly of the saw and above the table, the bracket having depending flanges disposed parallel to and on either side of said saw, bearing rollers carried by the bracket flanges, a guide support extending horizontally longitudinally of said bracket, guide means carried by the support for receiving the bearing rollers whereby said support may undergo longitudinal reciprocation relative to the bracket and saw, guard plates disposed longitudinally of the support and pivotally connected thereto, and means for resiliently maintaining said support forwardly of said bracket end in overlying relation to said saw.

LINZIE F. KRAMER.

REFERENCES CITED

The following references are of record in the file of this patent:

UNITED STATES PATENTS

| Number | Name | Date |
| --- | --- | --- |
| 1,050,649 | Harrold et al. | Jan. 14, 1913 |
| 1,054,558 | Jones | Feb. 25, 1913 |
| 1,154,209 | Rushton | Sept. 21, 1915 |
| 1,258,961 | Tattersall | Mar. 12, 1918 |
| 1,311,508 | Harrold | July 29, 1919 |
| 1,511,797 | Berghold | Oct. 14, 1924 |
| 264,412 | Kuhlmann | Sept. 12, 1882 |
| 2,106,321 | Guertin | Jan. 25, 1938 |
| 834,206 | Kantner | Oct. 23, 1906 |